G. F. WAKEFIELD.
CAR TIME FINDER.
APPLICATION FILED DEC. 28, 1914.

1,153,471.

Patented Sept. 14, 1915.

UNITED STATES PATENT OFFICE.

GEORGE F. WAKEFIELD, OF SAN JOSE, CALIFORNIA.

CAR-TIME FINDER.

1,153,471.  Specification of Letters Patent.  Patented Sept. 14, 1915.

Application filed December 28, 1914. Serial No. 879,308.

*To all whom it may concern:*

Be it known that I, GEORGE F. WAKEFIELD, a citizen of the United States, residing at San Jose, in the county of Santa Clara and State of California, have invented new and useful Improvements in Car-Time Finders, of which the following is a specification.

My invention relates to improvements in car or other conveyance time tables.

The objects of my improvements are; first, to eliminate all numerals representing the time of the arrival or departure of a car at any point on its run, except at the beginning or ending points of such run; second, to indicate the run of a car as a straight line and marked off in equal divisions of time, the line to be of such length as the number of minutes, or other division of time, it requires for that car to travel from the beginning to the ending points of its run; third, to ascertain, by means of a separate scale of minutes past the hour, the time a car is due at every point on its run, or vice versa where a car should be at any moment of its run; and, fourth, to show, without any calculation, the time required for a car to travel between any two or more points on its run.

The invention comprises a card, or an equivalent surface, upon which are marked the run, the location of streets or stations, and subdivisions, indicating distances passed over by a car, in any number of minutes.

It also includes a reversible and adjustable scale, applicable to the run line, so that the time of arrival at, or departure from, any point on the line may be correctly ascertained.

It also comprises details of construction which will be more fully explained by reference to the accompanying drawings, in which—

Figure 1 is a view of a card showing a certain street car line, cross streets, an independent connection transfer line, and a scale of minute sub-divisions of time, the scale being shown in the four positions assumed for estimating a trip from the main line to the transfer line. Fig. 2 is a top plan view of the card having an endless scale. Fig. 3 is an enlarged cross section of Fig. 2.

It will be seen in the drawing that the car run is indicated by a horizontal line AA; that this run line is divided into measurements of equal length BB, each of which represents one minute of time, and also that through each minute point is a vertical line CC to represent that same minute point both above and below the run line; that the run is designated by a letter "A," and that at each end of the run line the starting time of the first, last and all intervening cars for the day are given, those of regular runs being designated by the minute past the hour, in starting time table blocks DD; also that each time table block is designated by the letter of the run and an arbitrary number EE for designation purposes; also that the names of the street or streets FF, NN, OO, PP, along which the cars run, are placed parallel with the run line and the names of cross streets GG at right angles thereto.

Being on Santa Clara street, FF, at the corner of Tenth street, UU, as shown in the drawings, and wishing to take a car to Jones street, U, at its crossing of the Alameda, NN, and as there is no car at my starting point I look at my watch and find the time to be ten minutes past the hour of 3 p. m. When is the next car due at my starting point UU and when will it reach Jones street, U. Now as the drawing shows my destination at U to be on the left of my starting point at UU the car I wish will travel from right to left and therefore will start from point T at starting time table block $A^1$. I now lay the scale, HH, of minutes past the hour, whether independent and movable longitudinally as shown in Fig. 1 or an endless belt as shown in Figs. 2 and 3, parallel with the run line "A" with that end of the scale having the higher number of minutes also indicated by the direction the arrow, II, points, to the left the direction my car will travel and then slide the scale, in either direction, until its ten minute CC mark, which is the time my watch reads, is on the same vertical or minute line as is my starting point UU. With the scale held in this, the first position, I find that the reading on the same minute line as that of the car's starting point, T, at starting time table block $A^1$ is three minutes or three minutes past the hour of 3 p. m. I now look in this block to find the starting time for the car. Therefore as the drawings show, by the number of intervening minute spaces, that it takes seven minutes for a car to travel from its starting point T to my starting point at UU a car would have had to have started at $3.10'-.07=3.03$ to have reached my point at 3.10, but as the time table shows that no car was due to leave at 3.03 I must look for the next later one which I find to be at ten minutes past the hour or 3.10 p. m. so I slide the scale until its ten minute mark is on the same minute line as that passing through the car's starting point when the scale is now in position 2, as shown in the drawings. I now find that the seventeen minute point on the scale is opposite my starting point and therefore indicates the time the next car is due there and, furthermore, the scale is in position to show the time the car is due at every point on its run. It will reach Jones street, or U, at thirty-four minutes past the hour, V at thirty-nine minutes or 3.39 p. m. and the end of its run at W at 3.43.

If, instead of leaving the car at U, I decide to go to the S. P. depot, X, on Franklin street the drawings show I must change to a car of another run, the D run, and that the double pointed arrow with the letter D between indicates that the D run cars both diverge from and converge with the left end portion of the A run at the point V which is, therefore, where I must change. I have already found that my car is due at V at 3.39 p. m., but as there is no car on the D run at this point I must now find when the next D run car will pass here and when it will reach X. By inspection of the diagram I find that that portion of the D run extending from V to X diverges from the A run line. Therefore I now reverse the scale and set it with the thirty-nine minute (3.39) mark, the time I am due at V or VV on the minute line passing through that point as shown by the third position. In this new position I observe that the thirty-five minute (3.35 p. m.) mark is on the same minute line as W, the starting point for my car at $D^2$, so I look in that block for the starting time of my car. I find that instead of the D run being a regular one it is an irregular one and that as there is no car at 3.35 p. m. I look for the next later which is at 3.41, so I slide the scale in the direction opposite to that indicated by the arrow until forty-one minutes is on the starting point minute line, as shown by position 4, when the scale now indicates the time the car will reach all points on its run which at V or VV is 3.45 and at X is 3.47. In the same manner by the use of the scale I can ascertain the time when a car will pass a given point in cases where an inbound car travels at a different rate of speed than the outbound car.

By the use of this device any person wishing to take a car at any distance from the starting point, and having the starting time table, can ascertain when a car will reach his position, and also when it will reach the terminus, or any other point on the line.

Having thus described my invention, what I claim and desire to secure by Letters Patent is—

A car time finder consisting of a card upon which are shown a straight line indicating the distance over which the car passes, parallel transverse lines intersecting and extending on opposite sides of the first line, and transverse lines corresponding with the distance traversed by the car in each minute during its scheduled run, and a starting time table block at each end of the first line provided with the scheduled starting time for each car, and an adjustable scale having minute sub-division lines associable with those of the card and with the starting time table blocks whereby, on setting the minute mark of the scale at a station between the terminals corresponding to the period of the day, the time at which a car should have left its starting point in order to arrive at the specified station at such period of the day may be ascertained, and whereby on subsequently setting the minute indication of the scale, next designated by the starting time table block, after the ascertained time, at the starting point the correct time of arrival at the specified station and at the destination may be ascertained, said adjustable scale further having sets of members on the sub-division lines arranged in inverse relation to one another and designating the minutes of the hour.

In testimony whereof I have hereunto set my hand in the presence of two subscribing witnesses.

GEORGE F. WAKEFIELD.

Witnesses:
 PAUL FURST,
 W. S. CLAYTON.